United States Patent Office 3,472,804
Patented Oct. 14, 1969

3,472,804
INSOLUBLE FILMS BASED ON POLYVINYL ALCOHOL AND PROCESS FOR THE PREPARATION THEREOF
Luciano Nobile and Emanuele Condorelli, Milan, and Carlo Tesei, Monza, Milan, Italy, assignors to Ledoga S.p.A., a corporation of Italy
No Drawing. Filed May 16, 1966, Ser. No. 550,160
Claims priority, application Italy, Jan. 29, 1966, 13,951/64
Int. Cl. C08f 29/30
U.S. Cl. 260—17.3
6 Claims

ABSTRACT OF THE DISCLOSURE

Filmogeneous compositions based on polyvinyl alcohol, starch, dextrin, dimethylol urea and a polyalcohol plasticizer, water insoluble films prepared therefrom and process for said preparation are disclosed.

---

The present invention is concerned with filmogenous compositions based on starch or dextrine, hydrosoluble and polymerizable derivatives of formaldehyde, and polyvinyl alcohol, as well as with self-supporting insoluble films, obtained from said compositions, and with a process for the production thereof.

Films obtained from aqueous solutions of polyvinyl alcohol are known; said films, though having in general excellent mechanical characteristics, show the inconvenience of being water-soluble and steam-permeable, besides being remarkably expensive.

Many tentatives were carried out in order to reduce the cost of polyvinyl alcohol films or to modify their properties, for instance by addition of substantial amounts of diluents or extenders.

In fact there are known films obtained from compositions e.g. of polyvinyl alcohols and dextrines; however, though being less costly, they are not only soluble in water but also exhibit a sticky surface.

It is also known, that water-insoluble films can be obtained having suitable compositions of polyvinyl alcohol and hydrosoluble and polymerizable formaldehyde derivatives; however, these films are very costly since the polyvinyl alcohol percentage contained therein must be very high, e.g. of the order of 80%, otherwise the obtained films show poor mechanical resistance and transparency.

We have found that it is possible to obtain water-insoluble and non-sticky films, which moreover may also possess an excellent transparency and be very thin, gas impermeable, endowed with excellent mechanical characteristics, having in particular high tear strength and, finally, inexpensive, if filmogenous compositions are employed which, besides the plasticizer, essentially contain polyvinyl alcohol, starch or in particular dextrine, and derivatives of dimethylolurea or of phenolformaldehyde or of melamine-formaldehyde.

Furthermore we have found that films having said characteristics may be obtained also from compositions in which the polyvinyl alcohol content is strongly reduced and is, for instance, lower than the sum of the other two cited components.

The man skilled in the art knows that the greatest difficulty to overcome for obtaining films having good characteristics from polyvinyl alcohol and a diluent or an additive, is that the two substances must be compatible; for this purpose it is, in general, necessary that the content of solids, polyvinyl alcohol plus diluent and additive, in the filmogenous composition, shall be lower than 15%.

Of course, solutions with such a low solid content involve, as a consequence, high heat consumption to evaporate the water from the filmogenous compositions, in order to obtain the finished film.

We have now found that, contrarily to what could be foreseen, the three heterogeneous substances, polyvinyl alcohol, starch or dextrine, soluble and polymerizable formaldehyde derivative, are compatible one with the other, within the range of the composition hereinafter described, not only in the filmogenous composition but also in the finished film, and that such compatibility can be obtained by concentrations of solids also higher than 24%.

Equally unforeseeable was the possibility, found by us, of obtaining films having excellent characteristics from the compositions of the present invention, that is containing only little more than 30% of polyvinyl alcohol, excluding water.

We have also found that the compatibility of the above mentioned substances, both in the filmogenous compositions and in the film, can be increased by adding small amounts of sodium or potassium tetraborate and that, when exceeding a certain limit, said compatibility will diminish and as a first consequence the film transparency will be reduced.

The films of the present invention are obtained from compositions consisting of:

solid substances, this term includes only polyvinyl alcohol, starch or dextrine, and formaldehyde derivative;
liquid substances, this term includes water and plasticizer;
small amounts of catalysts; optional additives, in order to increase the compatibility of the solid substances, dyestuffs, emulsifiers, gelifying agents.

The compositions of the present invention have a content of solid substances lower than 30%; the solid substances having a percent composition defined by the following ratios:

| | Percent |
|---|---|
| Polyvinyl alcohol | ≧37 |
| Dextrine or starch | ≦45 |
| Formaldehyde derivative | ≦20 | while the plasticizer, for instance glycerol, is in proportion of from 10 to 40% on the solids.

More particularly, the filmogenous compositions giving films of excellent physical and mechanical characteristics and of low cost, have a content of solid substances comprised between 30 and 20%; the composition of the solid substance is:

| | Percent |
|---|---|
| Polyvinyl alcohol | 40–50 |
| Dextrine or starch | 34–43 |
| Formaldehyde derivative | 12–20 |

The plasticizer is in proportion of from 15 to 25% of the solid substances.

In particular we found that the films obtained from the latter compositions, using white dextrine, methylolurea and polyvinyl alcohol of high or medium viscosity, have an elevated transparency as well as the already mentioned excellent characteristics.

The starting materials employed for the preparation of the filmable compositions and of the films of the present invention, are:

starches, and in particular dextrines, especially white dextrines, obtained from various starches;
polyvinyl alcohols having high or medium molecular weight and highly and preferably completely hydrolysed;
soluble and polymerizable derivatives of formaldehyde, more precisely the reaction compounds of formaldehyde with urea, or with melamine or with phenol;

polymerization catalysts of said formaldehyde derivatives, such as ammonium chloride, sulphate or nitrate;

polyalcohols as plasticizers of the film, e.g. glycols, ethylene or propylene polyglycols, sorbitol, xylitol, and in particular glycerol;

various additives, in small amounts, among which we may mention the sodium tetraborate, optional dyestuffs, emulsifiers.

The process for obtaining the films of the present invention comprises the following stages:

dissolution of the dextrine or starch, and additives if any, in warm water, thus obtaining concentrated solutions, also with more than 35% by weight of dry substance;

separate dissolution of polyvinyl alcohol in water water, not exceeding, for the more viscous types, a 20% of solids content;

mixing the two solutions, obtaining preferably solutions having more than 24% of dry substance; at this point it is possible to obtain over 45% by weight of dextrine in the solids without exhibiting phenomena of incompatibility in the solution nor when dry;

addition of the plasticizer; then of the formaldehyde derivative and of the polymerization catalyst;

deaeration under vacuum;

film casting at about 90° C. onto a smooth surface;

heating of the film to 110–150° C. over a time comprised between 30 seconds and 3 minutes.

In this latter operation, the polymerization of the formaldehyde derivative and contemporaneous drying of the film are achieved.

The humidity of the obtained film is 2 to 5%; the film can be wound on a roll without risking that it sticks.

The film may be coupled with other plastic films for instance of polyethylene, polypropylene, polyvinyl chloride etc., by means of suitable binding agents obtaining laminated sheath, impermeable to gases, which, depending on the characteristics of the coupled film, may be heat-weldable. These coupled films as well as the plain film of the invention are suitable for the most varied applications, for instance in the field of packaging, of gas containers, of metal protection.

The invention will now be described in the following examples by exemplifying but not limiting way:

EXAMPLE 1

The starting materials for the preparation of the film were: white dextrine from potatoes, polyvinyl alcohol having high viscosity and being completely hydrolyzed, dimethylolurea, glycerol, sodium tetraborate and ammonium chloride.

The commercial white dextrine of potatoes had the following analytical characteristics:

|  | Percent |
|---|---|
| Solubility in $H_2O$ at 35° C. | 77.16 |
| Ash content | 0.22 |
| Humidity | 3.49 |
| HCl | 0.152 |

The polyvinyl alcohol used was of technical grade:

| | |
|---|---|
| pH of the 4% aqueous solution | 6.6 |
| Viscosity at the Hoeppler viscosimeter, of the same solution containing 4% of solids in water, at 20° C. centipoises | 68.24 |
| Percent of hydrolysis | 99.64 |
| Ash content percent | 0.57 |
| Percent of water | 3.78 |

We prepared the formaldehyde derivative, in known way, by reacting 2 moles of formaldehyde with 1 mole of urea; the reaction product, when I.R. analysed, appeared to consist of 100% dimethylolurea; this product was obtained in 20% aqueous solution and was used as such.

The technical type glycerol exhibited a straw color, neutral reaction under litmus, a density of 1.257, and ash content corresponding to 0.03%. The crystalline sodium tetraborate, commercial type, was crystallized with 10 molecules of water. The technical ammonium chloride exhibited a neutral reaction under litmus and a dry residue of 0.02%.

51 litres of purified water, 1 kg. of sodium tetraborate and 27.5 kg. of dextrine were dissolved in a 100 litre reactor provided with a stirrer, steam heating jacket and reflux cooler. The temperature was brought up to 80° C. under vacuum and these conditions were maintained until a limpid solution is obtained.

Apart and contemporaneously, 154 kg. of water and 38.4 kg. of polyvinyl alcohol were dissolved in a 500 litre reactor provided with a very efficient stirrer, steam jacket and reflux cooler. The temperature was gradually brought up to 90–95° C. under strong agitation and for a time required to obtain a perfectly limpid solution. Once ready both solution, the dextrine solution is passed over into the 500 litre reactor and 19.8 kg. of glycerol were added, while stirring, over a time of about half an hour. After this time, 64.8 kg. of 20% aqueous solution of dimethylolurea, and 1.29 kg. of ammonium chloride dissolved in 2 litres of water, were admixed to the thus obtained composition. The agitation and the temperature of 90° C. were further maintained for about one hour. After degasing of the paste obtained under slight vacuum (50 mm. Hg), the thus obtained viscous mass is spread by means of a doctor blade onto a continuous, highly polished stainless steel conveyor belt which conveys the thin moist layer into a drying tunnel, infrared red heated to a temperature of about 130° C., where it remains for 3 minutes. At the outlet from the drying tunnel, the film, transparent and colorless, is wound continuously on spools.

When operating in this way, no processing or storing difficulties, deriving from brittleness or stickiness of the film, are encountered. The physical properties of the obtained film are hereinafter reported and compared with those of a common film, made of polyvinyl alcohol alone, of the trade.

PHYSICAL AND MECHANICAL PROPERTIES

| | Film prepared by us | Commercial polyvinyl alcohol film |
|---|---|---|
| Thickness, micron | 22 | 40 |
| Weight, g./m.² | 25 | 45 |
| Tensile strength (transversal) at 50% RH (relative humidity), kg./mm.² | 1.985 | 1.76 |
| Tensile strength (longitudinal) at 50% RH, kg./mm.² | 2 | 1.785 |
| Transversal elongation at 50% RH, percent | 137 | 255 |
| Longitudinal elongation at 50% RH, percent | 128.5 | 230 |
| Bursting test: | | |
| Cupola height, kg./cm.² | 1.1 | 1.2 |
| Cupola height, mm. | 21 | 25 |
| Permeability to oxygen, cm.³/m.²/atm./24 h. | 1.2 | 15 |
| Solubility in water at the temperature of (° C.) | (¹) | 40 |
| Beckmann transmittancy, percent | (²) | (³) |

¹ Insoluble at 100° C.
² 80% in the visible.
³ 30% in the visible.

Attention is drawn particularly on the thinness of the film obtained, and on its excellent physical-mechanical properties, even superior to those of the commercial polyvinyl alcohol film which moreover is in comparison much more expensive.

EXAMPLE 2

The film obtained in the foregoing example was sandwich-coupled between a polyethylene film having 50 microns thickness and a polypropylene film having 15 micron thickness, by means of an apparatus known in the art as a "moulding lacquer," using as adhesive a glue based on isocyanate (products of addition of di-isocyanates with polyamines and polyalcohols) dissolved in toluene.

The compounded film obtained appeared homogeneous and was easily heat-weldable onto the polyethylene surface; impermeable to oxygen (1.1 cm.$^3$/sq. m./atm./24 h.); impermeable to steam (0.2 g./sq. m./24 h.). Good adhesiveness was measured between the surface of our film and the polypropylene film, namely 500 g./cm.; and between our film and the polyethylene film, namely 170 g./cm.

EXAMPLE 3

The present example illustrates a film preparation wherein the percentage of polyvinyl alcohol in the composition is further reduced with respect to the Example 1, thus allowing to obtain a film even less costly without reducing its physical-mechanical properties.

The starting materials employed are the same as in Example 1.

In a 500 litre reactor, 77 kg. of a previously prepared 35% dextrine solution containing 26.5 kg. of dextrine and 0.8 kg. of sodium tetraborate are added to 133 kg. of polyvinyl alcohol solution having 20% dry content. The whole is strongly stirred while maintaining the temperature at about 90° C. and adding 16 kg. of glycerol. After having obtained a homogeneous solution, there are added, during the last hour of preparation, while always maintaining the temperature at 90° C. as well as the stirring, 0.990 kg. of NH$_4$Cl in aqueous solution and 49.4 kg. of a 20% aqueous solution of dimethylolurea. The air was then degased from the paste according to the preceding indication and the paste was spread on the conveyor belt by means of a doctor blade; the film obtained after drying showed the following characteristics:

Thickness _____microns__ 50
Tensile strength (transversal) at 50% RH (relative
  humidity) _____kg./mm.$^2$__ 2.14
Tensile strength (longitudinal) at 50% RH
                                          kg./mm.$^2$__ 2.17
Transversal elongation at 50% RH _____percent__ 244
Longitudinal elongation at 50% RH ____percent__ 205
Beckmann transmittancy ___percent in the visible__ 70
Permeability to oxygen ___cm.$^3$/sq. m./atm./24 h__ 1.18

EXAMPLE 4

The present example illustrates a film preparation wherein, as compared to Example 3, a part of the dextrine substitutes an equal part of dimethylolurea. In a 3 litre flask, a previously prepared 35% solution of dextrine containing 242 g. of solid dextrine and 7 g. of tetraborate, was mixed with an already prepared 20% solution of polyvinyl alcohol equal to 242 g. of solid polyvinyl alcohol. Thereafter, while always stirring and at a temperature of 90° C., 135.5 g. of glycerol and subsequently 187 g. of dimethylolurea paste containing 40% of dry substance and 7.5 g. of solid ammonium chloride dissolved in water, were added. After degasing the incorporated air, the paste was poured onto a glass plate and the thickness of the moist viscose was equalized by means of a filmograph having a calibrated slit passing over the glass and being dragged by a small synchronous motor.

After drying in the oven the thus obtained film was detached, conditioned at 50% of relative humidity; the following physico-mechancial properties were found:

The film results insoluble in water.
Thickness _____microns__ 40
Tensile strength (transversal) at 50% RH (relative
  humidity) _____kg./mm.$^2$__ 2.3
Tensile strength (longitudinal) at 50/ RH
                                          kg./mm.$^2$__ 2.34
Transversal elongation at 50% RH _____percent__ 220
Longitudinal elongation at 50% RH ____percent__ 203
Beckmann transmittancy __ percent in the visible__ 75
Permeability to oxygen __cm.$^3$/sq. m./atm./24 h___ 1.5

Analogously to the films prepared in Examples 1 and 3, also the film described in this example did not show stickness or brittlenes even at high or low relative humidities.

EXAMPLE 5

This example illustrates the possibility of employing polyvinyl alcohol having medium viscosity instead of high viscosity (as in Examples 1, 2 and 3). The other starting materials employed in this case, had the same analytical characteristics as described at the beginning of Example 1. The commercial polyvinyl alcohol of medium viscosity employed for the preparation of the film spoken of in this example, when analysed showed the following characteristics:

pH of the 4% aqueous solution _____ 6.7
Viscosity at the Hoeppler viscosimeter of the same
  solution containing 4% of solid substance in
  water, at 20° C. _____centipoises__ 30.4
Percent of hydrolysis _____ 99.3
Ash content _____percent__ 1.05
Percent of humidity _____ 3.5

In a 1 litre flask provided with stirrer and reflux cooler, 4.08 g. of sodium tetraborate and 69 g. of dextrine were dissolved, at the temperature of 80° C. and under stirring, in 160 g. of water.

When this solution became limpid, it was poured into a 2 litre flask (provided with stirrer and reflux cooler over an electrically heated bath), wherein were previously prepared, 736 g. of an aqueous solution of the polyvinyl alcohol as described above, containing 13.05% of solid substance.

The mass was mixed while adding 49.5 g. of glycerol and maintaining the temperature inside the flask at 90° C. Thereafter were added 161.6 g. of a 20% solution of dimethylolurea and 3.23 g. of NH$_4$Cl, while agitating and for a further half an hour at 90° C.

A portion of the fluid mass obtained is spread onto glass plates calibrating it exactly by means of a filmograph having a slit of 500 microns. The plates are placed in an oven to dry; the films when detached from the plates and conditioned; showed the following characteristics:

Thickness _____microns__ 47
Tensile strength (transversal) at 50% RH (relative
  humidity) _____kg./mm.$^2$__ 2.40
Tensile strength (longitudinal) at 50% RH
                                          kg./mm.$^2$__ 2.43
Transversal elongation at 50% RH ____ percent__ 244
Longitudinal elongation at 50% RH ____percent__ 230
Beckmann transmittancy __percent in the visible__ 75
Permeability to oxygen __cm.$^3$/sq. m./atm./24 h__ 1.3

EXAMPLE 6

This example illustrates the effect of different percentages of sodium tetraborate present in the filmogeneous composition, with respect to the transparency; the casting composition was the same as in Example 1, except of course for what regards the tetraborate content.

The data are referred to a film having 50 micron thickness; the percentage of light transmission was measured with a conventional Beckmann apparatus.

| Percent of tetraborate in the solid substances +plastifier: | Average light transmission (visible spectrum) expressed in percent |
|---|---|
| 0 | 59 |
| 0.34 | 59.5 |
| 0.81 | 71 |
| 1.2 | 78 |
| 1.6 | 65 |

Analogous was the behavior of the film obtained from a casting composition wherein polyvinyl alcohol of medium molecular weight was employed.

Having thus described in invention, what is desired to be secured and claimed by Letters Patent is:

1. Filmogeneous compositions for the preparation of self-supporting water-insoluble, highly resistant films, consisting essentially of an aqueous solution comprising a solid portion consisting essentially of 40–50% of high or medium molecular weight polyvinyl alcohol, 34–43% of starch or white dextrines, 12–20% of dimethylolurea and 15–25% of a [plastifier based on the weight of the solid portion] polyalcohol plasticizer based on the weight of the solid portion.

2. Filmogenous compositions according to claim 1, wherein the white dextrines are at least 70% water-soluble at 35° C.

3. Filmogeneous compositions according to claim 1, containing catalytic amounts of a polymerization catalyst for the dimethylolurea and 0.7–1.4%, on the total solid content, of tetraborate.

4. A self-supporting, water insoluble, highly resistant film impermeable to gases containing essentially 40–50% of high or medium molecular weight polyvinyl alcohol, 34–43% of starch or white dextrines, 12–20% of dimethylolurea and of 15–25% of a polyalcohol plasticizer reckoned on the total weight of the three above components.

5. A self-supporting film according to claim 4, containing 0.7–1.4% of tetraborate reckoned on the total weight of the film.

6. Process for the production of a self-supported film according to claim 4 which comprises dissolving dextrine or starch in warm water to form a concentrated solution containing more than 35% by weight solids, separately dissolving polyvinyl alcohol in water to form an aqueous solution containing up to 20% solids, mixing the two solutions, then admixing the dimethylolurea and plasticizer in said solution, casting the film at about 90° C. and then heating the film at 110–150° C. between 30 seconds and 3 minutes.

References Cited
UNITED STATES PATENTS

| | | | |
|---|---|---|---|
| 2,127,896 | 8/1938 | Vohrer | 260—17.4 |
| 2,250,681 | 7/1941 | Schwartz. | |
| 2,385,714 | 9/1945 | LaPiana et al. | 260—17.3 |
| 2,439,108 | 4/1948 | Staehle. | |
| 2,448,358 | 8/1948 | Dangelmajer. | |
| 2,514,689 | 7/1950 | Woodward | 260—17.4 |
| 2,867,560 | 1/1959 | Strawinski. | |
| 3,219,613 | 11/1965 | Keene | 260—17.4 |
| 3,316,190 | 4/1967 | Suzumura et al. | 260—17.4 |

FOREIGN PATENTS

| | | |
|---|---|---|
| 494,929 | 11/1938 | Great Britain. |
| 584,217 | 1/1947 | Great Britain. |

WILLIAM H. SHORT, Primary Examiner

E. M. WOODBERRY, Assistant Examiner

U.S. Cl. X.R.

260—17.2; 264—216